United States Patent
Park et al.

(10) Patent No.: US 10,576,886 B2
(45) Date of Patent: Mar. 3, 2020

(54) HORN ACTUATING DEVICE OF MOTOR VEHICLE

(71) Applicants: Hyundai Motor Company, Seoul (KR); Kia Motors Corporation, Seoul (KR)

(72) Inventors: Jung Woo Park, Busan (KR); Jun Yong Min, Gyeonggi-do (KR); Han Sung Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/133,956

(22) Filed: Sep. 18, 2018

(65) Prior Publication Data

US 2019/0161004 A1 May 30, 2019

(30) Foreign Application Priority Data

Nov. 29, 2017 (KR) .................. 10-2017-0161268

(51) Int. Cl.
| | |
|---|---|
| *H01H 13/14* | (2006.01) |
| *H01H 13/04* | (2006.01) |
| *H01H 13/52* | (2006.01) |
| *B60Q 5/00* | (2006.01) |
| *B62D 1/04* | (2006.01) |
| *B60R 21/203* | (2006.01) |

(52) U.S. Cl.
CPC ............ *B60Q 5/003* (2013.01); *B62D 1/046* (2013.01); *H01H 13/04* (2013.01); *H01H 13/14* (2013.01); *H01H 13/52* (2013.01); *B60R 21/2037* (2013.01); *H01H 2221/044* (2013.01); *H01H 2231/026* (2013.01)

(58) Field of Classification Search
None
See application file for complete search history.

(56) References Cited

U.S. PATENT DOCUMENTS

| | | | |
|---|---|---|---|
| 5,647,610 A * | 7/1997 | Nagata | B60Q 5/003 280/731 |
| 2004/0046367 A1 | 3/2004 | Schneider et al. | |
| 2005/0062269 A1 | 3/2005 | Amamori | |
| 2005/0200104 A1 | 9/2005 | Xu et al. | |

FOREIGN PATENT DOCUMENTS

| | | |
|---|---|---|
| KR | 10-1404901 B1 | 6/2014 |
| KR | 10-1684963 B1 | 12/2016 |

\* cited by examiner

*Primary Examiner* — John F Mortell
(74) *Attorney, Agent, or Firm* — Mintz Levin Cohn Ferris Glovsky and Popeo, P.C.; Peter F. Corless

(57) ABSTRACT

A horn actuating device of a motor vehicle is provided to enhance operating feeling of a horn actuating cover installed on a steering wheel. The horn actuating device prevents shaking of a horn actuating cover and prevents deterioration of operating feeling of the horn actuating cover by adopting a structural elastic member configured such that after the horn actuating cover for actuating a horn is actuated, the elastic member for returning the horn actuating cover back to an original position restrains shaking of the horn actuating cover and then installing the elastic member between the horn actuating cover and a horn mounting portion.

14 Claims, 5 Drawing Sheets

< before operation >    < after operation >

HORN ACTUATING DEVICE OF MOTOR VEHICLE

CROSS-REFERENCE(S) TO RELATED APPLICATION

This application claims under 35 U.S.C. § 119(a) the benefit of priority to Korean Patent Application No. 10-2017-0161268 filed on Nov. 29, 2017, the entire contents of which are incorporated herein by reference.

BACKGROUND (a) Technical Field

The present disclosure relates to a horn actuating device of a motor vehicle, and more particularly, to a horn actuating device of a motor vehicle that enhances an operating feeling of a horn actuating cover installed on a steering wheel.

(b) Background Art

Generally, a steering wheel of a motor vehicle is provided with a horn actuating device for generating an alarm sound and the horn actuating device is divided into a fixed type and a floating type. The fixed type horn actuating device has a structure in which a cover for actuating a horn for generating the alarm sound, that is, a horn actuating cover, is fixed to a steering wheel wherein when the horn actuating cover made of a soft material is pressed, a circuit for activating the horn is electrically energized, thereby emitting the alarm sound.

The floating type horn actuating device has a structure in which the horn actuating cover is floated from a cover mounting portion fixed to the steering wheel wherein when the horn actuating cover having been floated is pressed down, the horn actuating cover moves down toward the cover mounting portion and the circuit for activating the horn is electrically energized, thereby emitting the alarm sound. This floating type horn actuating device is configured such that the horn actuating cover maintains a gap from the periphery of the cover mounting portion to secure an operating feeling. In the prior art, the cover mounting portion was provided with ribs for preventing the shaking of the horn actuating cover because shaking of the horn actuating cover is caused by the existence of the gap.

However, due to addition of ribs onto the cover mounting portion, interference between the horn actuating cover and the ribs occurs when the horn actuating cover moves down and, as a result, an operating feeling of the horn actuating cover is deteriorated.

The above information disclosed in this section is merely for enhancement of understanding of the background of the invention and therefore it may contain information that does not form the prior art that is already known in this country to a person of ordinary skill in the art.

SUMMARY

The present disclosure provides a horn actuating device of a motor vehicle that prevents shaking (or similar movement) of a horn actuating cover and also prevents an operating feeling of the horn actuating cover from being deteriorated by adopting a novel structural elastic member configured such that after the horn actuating cover for actuating a horn is actuated, the elastic member for returning the horn actuating cover back to an original position restrains shaking of the horn actuating cover and then installing the elastic member between the horn actuating cover and a horn mounting portion.

In one aspect, the present disclosure provides a horn actuating device for generating alarm sound that may include a horn actuating cover installed on a cover mounting portion of a steering wheel, and descends while maintaining a gap between the horn actuating cover and the cover mounting portion; and a plurality of elastic members disposed between the horn actuating cover and the cover mounting portion, and formed to elastically support shaking of the horn actuating cover, which is caused by the gap, and generate elastic restoring force for returning the horn actuating cover back to an original position while being deformed when the horn actuating cover is actuated.

In an exemplary embodiment, the elastic member is adopted as a structure that may include a fixing portion fixed to the cover mounting portion; an inclined portion formed to be inclined with respect to ascending and descending directions of the horn actuating cover to support a bottom end of the horn actuating cover; and a bent portion formed between the fixing portion and the inclined portion and formed in a configuration bent to generate elastic restoring force while being deformed when the horn actuating cover is actuated. Specifically, the bent portion is formed to be curved in a ∩ shape (e.g., an inverted U shape) and both ends of the bent portion may be integrally connected to one end of the fixing portion and one end of the inclined portion respectively. The bent portion generates elastic restoring force as the inclined portion is pushed and moved toward the cover mounting portion and thus compressed when the horn actuating cover is moved down.

In another exemplary embodiment, the elastic member may be made of an electric conductive material and when the horn actuating cover is actuated to move down, electrical conductive contact between the elastic member and an electric conductive ground terminal of the horn provided on the steering wheel is made to generate alarm sound. In particular, the ground terminal of the horn may be disposed below the inclined portion and thus, the ground terminal may contact the inclined portion when the horn actuating cover is actuated to move down.

In addition, the elastic member has a structure that may include a fixing portion fixed to the cover mounting portion; an inclined portion having a support portion for supporting a bottom end of the horn actuating cover; and a bent portion formed between the fixing portion and the inclined portion and formed in a configuration bent to generate elastic restoring force while being deformed when the horn actuating cover is actuated. Specifically, the support portion may be formed at the inclined portion to protrude to an opposite side of the cover mounting portion, while the bent portion is formed to be curved in an inverted U shape and both ends of the bent portion may be integrally connected to one end of the fixing portion and one end of the inclined portion respectively. The bent portion generates elastic restoring force as the support portion is moved together with the horn actuating portion and thus deformed when the horn actuating cover is moved down.

The horn actuating device of a motor vehicle according to the present disclosure has advantages in that as the horn actuating cover is installed to be floated outside the cover mounting portion by the elastic member, elastic restoring force for returning the horn actuating cover back to an original position may be applied to the horn actuating cover and simultaneously the elastic member may prevent horizontal shaking of the horn actuating cover when actuating force of the horn actuating cover is removed and thus, rattle noise caused by the shaking may be reduced and thus may be is enhanced and that as movement of the horn actuating cover is not restrained even when the horn actuating cover is actuated, deterioration of operating feeling of the horn actuating cover may be prevented.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

Figure 1:
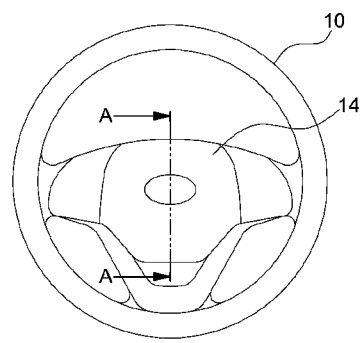
FIG. 1 is a view illustrating a steering wheel to which a horn actuating device of a motor vehicle according to an exemplary embodiment of the present disclosure is applied.

It should be understood that the appended drawings are not necessarily to scale, presenting a somewhat simplified representation of various exemplary features illustrative of the basic principles of the present disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present disclosure will be described in detail such that those skilled in the art can easily carry out the present disclosure.

The horn actuating device of a motor vehicle according to the present disclosure prevents an operating feeling of the horn actuating cover from being deteriorated due to interference with a configuration for preventing shaking of the horn actuating cover wherein the device utilizes an elastic member which prevents the shaking of the horn actuating cover but does not restrain the horn actuating cover. As known, in the case of the floating type horn actuating device, since the horn actuating cover to be installed on the cover mounting portion of the steering wheel is installed in a structure being floated outside the cover mounting portion such that a gap is maintained between the horn actuating cover and the cover mounting portion to remove interference between the horn actuating cover and the cover mounting portion, shaking of the horn actuating cover occurs.

According to a horn actuating device of the prior art, a separate configuration such as a rib is added to the cover mounting portion to prevent the shaking of the horn actuating cover. However, an operating feeling of the horn actuating cover is deteriorated due to interference with the rib. Therefore, the present disclosure adopts a novel structural elastic member (or elastic structural body) configured such that after a horn actuating cover for actuating a horn for generating alarm sound, which is referred to as a horn actuating cover, is actuated, the elastic member for returning the horn actuating cover back to an original position restrains shaking of the horn actuating cover and then installs the elastic member between the horn actuating cover and a horn mounting portion, to prevent shaking of the horn actuating cover and also an operating feeling of the horn actuating cover is prevented from being deteriorated.

A horn actuating device of a motor vehicle according to exemplary embodiments of the present disclosure will now be described with reference to FIGS. 1 to 9 attached hereto. Firstly, a horn actuating device of a motor vehicle according to an exemplary embodiment of the present disclosure will be described with reference to FIGS. 1 to 5.

Figure 2:
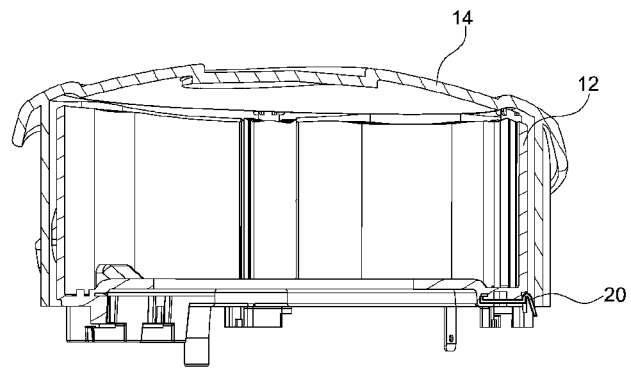
FIG. 2 is a view illustrating a horn actuating device of a motor vehicle, using an elastic member according to an exemplary embodiment of the present disclosure.
Figure 3:
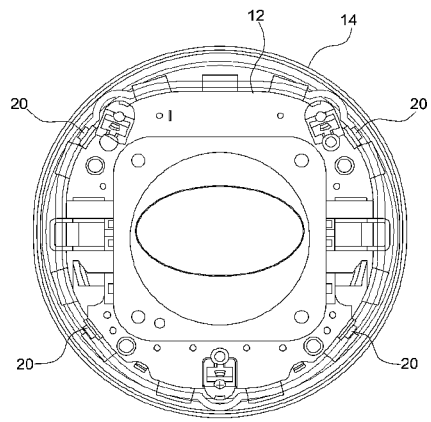
FIG. 3 is a bottom view illustrating a horn actuating device of a motor vehicle according to an exemplary embodiment of the present disclosure.

FIG. 1 is a view illustrating a steering wheel to which a horn actuating device of a motor vehicle according to an exemplary embodiment of the present disclosure is applied, FIG. 2 is a cross-sectional view of the horn actuating device taken along line A-A in FIG. 1 and FIG. 3 is a bottom view of the horn actuating device. As shown in FIGS. 1 to 3, the horn actuating device according to an exemplary embodiment of the present disclosure may include a plurality of elastic members 20 installed between a cover mounting portion 12 of a steering wheel 10 and a horn actuating cover 14.

In particular, the cover mounting portion 12 is installed and fixed to a central portion of the steering wheel 10 wherein various components for emitting an alarm sound when the horn actuating cover 14 is actuated to move down are fixed, except the horn actuating cover 14. The cover mounting portion 12 may have a cylindrical structure with an internal space (e.g., hollow interior). The various components may include a circuit for allowing electric current to flow to the horn for generating alarm sound when the horn actuating cover 14 is actuated and the like. One end of the circuit may be connected to a ground terminal of the horn of the steering wheel 10 (see reference numeral 16 in FIG. 5) with the elastic member 20 interposed therebetween. The ground terminal 16 of the horn provides ground connection of electrical signal and may be made of a material capable of making electric conduction smooth, such as a magnesium material. In other words, the horn actuating device of the present disclosure may have a structure in which the horn actuating cover 14 having been floated outside the cover mounting portion 12 is pressed down toward the cover mounting portion 12 when actuating force is applied to the horn actuating cover 14 to allow for electrical conduction to the horn for generating the alarm sound.

Figure 5:
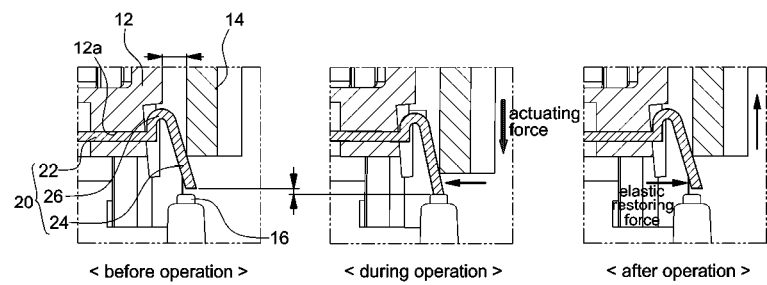
FIG. 5 is a view illustrating actuating states of an elastic member according to an exemplary embodiment of the present disclosure.

As the horn actuating cover 14 is pressed and moved down toward the cover mounting portion 12, the conductive ground terminal 16 of the horn installed at the center portion of the steering wheel 10 contacts the elastic member 20 and then electric conduction to the horn for generating the alarm sound occurs (see FIG. 5). In particular, the ground terminal 16 of the horn may be disposed below the elastic member 20 and may contact the horn actuating cover 14 when the horn actuating cover is moved down. The horn actuating cover 14 may be installed to be floated outside the cover mounting portion 12 with the elastic member 20 interposed therebetween. Further, the horn actuating cover may be formed to have a longer circumference than the circumference of the cover mounting portion 12 and thus, a gap may be formed between the horn actuating cover and the cover mounting portion 12 when installed on the cover mounting portion 12.

In other words, the horn actuating cover 14 surrounds the cover mounting portion 12 with the gap interposed therebetween when fitted in a state of being floated outside the cover mounting portion 12 and the elastic member 20 may be installed on the cover mounting portion 12 to maintain the gap between the horn actuating cover 14 and the cover mounting portion 12. The horn actuating cover 14 may be seated on the elastic member 20 by being fitted to the outside of the cover mounting portion 12 after the elastic member 20 is installed on the cover mounting portion 12. The horn actuating cover 14 remains in a state of being floated from all components except for the elastic member 20 until the horn actuating cover 14 is actuated.

Figure 4:
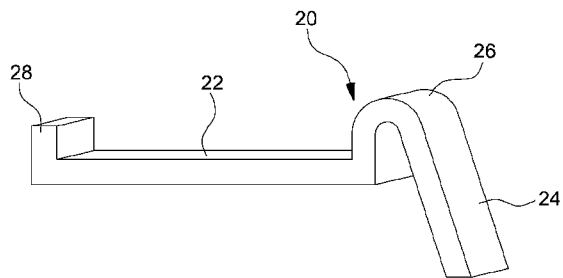
FIG. 4 is a perspective view illustrating an elastic member according to an exemplary embodiment of the present disclosure.

The elastic member 20 may be installed between the cover mounting portion 12 and the horn actuating cover 14 to elastically bear and support the horn actuating cover 14 in a load-free state. When the horn actuating cover 14 is pressed down by actuating force applied by the driver and moved down axially (or vertically), the elastic member 20 may be deformed, thereby generating elastic restoring force. The elastic member 20 may be configured to generate elastic restoring force for restoring the position of the horn actuating cover 14 when the horn actuating cover 14 is actuated and may also prevent shaking of the horn actuating cover 14. Accordingly, the elastic member 20 may be configured as a structure having a fixing portion 22, an inclined portion 24 and a bent portion 26 integrally formed between the fixing portion 22 and the inclined portion 24, as shown in FIG. 4.

The fixing portion 22 may be inserted and fixed to a support portion 12*a* or 36 formed on an outer peripheral surface of the cover mounting portion 12. To prevent rotational shaking within the support portion 12*a* or 36, the fixing portion 22 may be formed in a form of a bar having a polygonal cross section, which is illustrated in a form of a bar having a quadrangle cross section in the exemplary embodiment shown in FIG. 4. The fixing portion 22 may be connected to one end of the circuit for electric conduction to the horn, for example, a horn plate electrically connected to a horn connector comprised in the circuit when the fixing portion is installed on the support portion 12*a* or 36 of the cover mounting portion 12.

In addition, the fixing portion 22 may be provided at one end in a longitudinal direction with a hook portion 28 to prevent breakaway from the support portion 12*a* or 36. The hook portion 28 provided at the fixing portion 22 makes it possible to prevent the fixing portion from being broken away from the support portion 12*a* or 36 due to load transmitted while the elastic member 20 is deformed when the horn actuating cover 14 is moved down. The hook portion 28 may be formed to protrude upward at one end of the fixing portion 22 (i.e., one end (e.g., a second end) opposite to the other end (e.g., a first end) connected to the bent portion).

The inclined portion 24 may be formed to be inclined with respect to an axial direction of the horn actuating cover 14 to support a bottom end of the horn actuating cover 14 fitted to the outside of the cover mounting portion 12. Specifically, the inclined portion may be formed to be inclined with respect to the axial direction of the cover mounting portion 12 and a moving direction (i.e., ascending and descending directions) of the horn actuating cover 14 based on the state in which the fixing portion 22 is installed on the cover mounting portion 12. The fixing portion 22 may be formed to extend in a direction perpendicular to the axial direction of the cover mounting portion 12 (i.e., in a horizontal direction).

The bent portion 26 may be bent to thus be deformed and simultaneously may generate elastic restoring force when the horn actuating cover 14 is actuated to move down wherein both ends thereof are integrally connected to one end of the fixing portion 22 and one end of the inclined portion 24 respectively. In addition, the bent portion may be formed to be bent in a deformable direction when the inclined portion 24 is pressed by actuation of the hinge actuating cover 14. For example, the bent portion may be formed in a bent structure having a ∩ shape (i.e., inverted U shape) as shown in FIG. 4.

Hereinafter, states of the elastic member 20 before and after the horn actuating cover 14 is actuated will be described with reference to FIGS. 2 and 5. As shown in FIGS. 2 and 5, the elastic member 20 configured as mentioned above maintains a state that the bottom end of the horn actuating cover 14 is seated on the inclined portion 24 until the horn actuating cover 14 is actuated to move down. In particular, the inclined portion 24 is pressed toward the cover mounting portion 12 by load of the horn actuating cover 14 and the load of the horn actuating cover 14 is counterbalanced by elastic force of the bent portion 26. As a result, the horn actuating cover 14 may be supported while being floated outside the cover mounting portion 12 with a gap interposed therebetween and thus, shaking of the horn actuating cover 14 due to the gap may be prevented.

As shown in the view arranged in the middle portion of FIG. 5, when actuating force of the driver is applied to the horn actuating cover 14 in the axial direction of the horn actuating cover 14 under the state as mentioned above, that is, when the horn actuating cover 14 is pushed and moved down toward the cover mounting portion 12, the elastic member 20 works in a way that the inclined portion 24 is pushed toward the cover mounting portion 12 and thus, the bent portion 26 may be bent and compressed further than before deformation, whereas the horn actuating cover 14 may be moved down toward a bottom face of the cover mounting portion 12 while maintaining contact with the surface of the inclined portion 24.

At this time, a bottom end of the inclined portion 24 comes into contact with the ground terminal 16 of the horn in conjunction with descending movement of the horn actuating cover 14 and thus, electric conduction contact between the elastic member 20 and the ground terminal 16 of the horn occurs. Thus, electric conduction to the horn for generating alarm sound is made and an alarm sound is generated. Accordingly, the ground terminal 16 of the horn may be disposed below the inclined portion 24 such that the ground terminal contacts the inclined portion 24 when the horn actuating cover 14 is moved down.

As shown in the right view of FIG. 5, when the actuating force of the horn actuating cover 14 is removed after the horn actuating cover 14 is moved down, the elastic member 20 releases the elastic restoring force generated while the bent portion 26 is compressed, and thus, the inclined portion 24 is pushed out toward a side opposite to the cover mounting portion 12. At this time, the bottom end of the horn actuating cover 14, which is in contact with the surface of the inclined portion 24, moves upward along the inclined portion 24 and thus, the horn actuating cover 14 returns back to an original position.

To secure stability and reliability of operation of the horn actuating cover 14, a plurality of elastic members may be disposed between the cover mounting portion 12 and the horn actuating cover 14. For example, three or more elastic members may be disposed at regular intervals in a circumferential direction of the horn actuating cover 14 but only two elastic members may be installed.

FIG. 3 illustrates a state in which four elastic members 20 are arranged in the circumferential direction of the cover mounting portion 12 and the horn actuating cover 14. Meanwhile, although the elastic member 20 may support the horn actuating cover 14 stably since the inclined portion 24 may be inclined at a predetermined angle, to the elastic member 20 may further include a support portion 36 that more stably supports the horn actuating cover 14.

Figure 6:
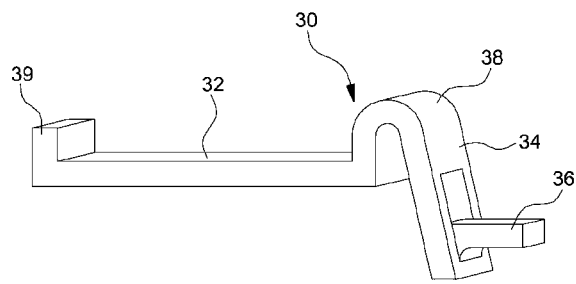
FIG. 6 is a perspective view illustrating an elastic member according to another exemplary embodiment of the present disclosure.
Figure 7:
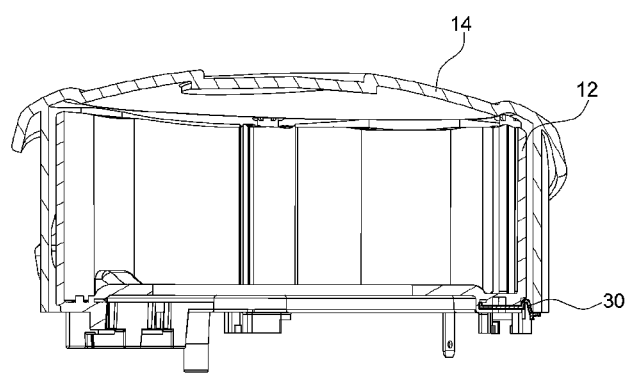
FIG. 7 is a view illustrating a horn actuating device of a motor vehicle, using an elastic member according to another exemplary embodiment of the present disclosure.

Hereinafter, an elastic member 30 having the support portion 36 will be described with reference to FIGS. 6 and 7 attached hereto. As shown in FIGS. 6 and 7, the elastic member 30 may include a fixing portion 32, an inclined portion 34 and a bent portion 38 integrally formed between the fixing portion 32 and the inclined portion 34 and may further include a support portion 36 formed to protrude at the inclined portion 34.

The fixing portion 32 may be formed in the same way as the fixing portion 22 (see FIGS. 2 to 5) of the former exemplary embodiment as described above. In other words, the fixing portion may be formed to be inserted and fixed to the support portion 36 or 12a formed on the outer peripheral surface of the cover mounting portion 12 and may further include a hook portion 39 provided at one end of the fixing portion 32 to prevent breakaway from the support portion 36 or 12a.

Further, the inclined portion 34 may include the support portion 36 formed to protrude to bear and support the bottom end of the horn actuating cover 14 to be fitted into the cover mounting portion 12. The support portion 36 may be formed to extend toward a side that is opposite to the cover mounting portion 12 based on a state where the fixing portion 32 is installed on the cover mounting portion 12. To support the horn actuating cover 14 more stably, the support portion may be formed to extend in a direction perpendicular to the axial direction of the cover mounting portion 12 (i.e., in a horizontal direction).

Figure 8:
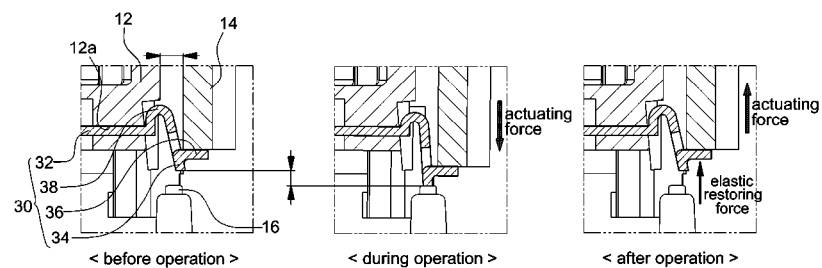
FIG. 8 is a view illustrating actuating states of an elastic member according to another exemplary embodiment of the present disclosure.

In particular, since the inclined portion 34 supports the bottom end of the horn actuating cover 14 with the aid of the support portion 36, it is not necessary for the inclined portion to be formed inclined with respect to the axial direction (or the direction of ascending and descending movement) of the horn actuating cover 14, and the inclined portion may be formed to be inclined with respect to the axial direction of the horn actuating cover 14 as shown in FIGS. 7 and 8.

The bent portion 38 may be formed in a bent structure to be deformed and simultaneously may generate elastic restoring force when the horn actuating cover 14 is actuated wherein both ends thereof are integrally connected to one end of the fixing portion 32 and one end of the inclined portion 34 respectively. In addition, the bent portion may be formed to be bent in a deformable direction when the support portion 36 is pressed and moved down in the axial direction of the horn actuating cover 14 during operation of the horn actuating cover 14. For example, the bent portion may be formed in a bent structure having a ∩ shape as shown in FIG. 6.

Figure 9:
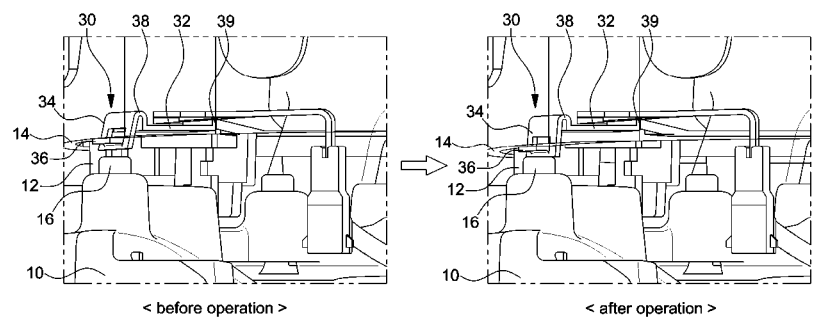
FIG. 9 is a perspective view illustrating actuating states of an elastic member according to another exemplary embodiment of the present disclosure.

Hereinafter, states of the elastic member 30 before and after the horn actuating cover 14 is actuated will be described with reference to FIGS. 7 to 9. As shown in FIGS. 7 to 9, the elastic member 30 configured as mentioned above maintains a state that the bottom end of the horn actuating cover 14 is seated on the support portion 36 until the horn actuating cover 14 is actuated. In particular, the support portion is pressed to the axial direction of the horn actuating cover 14 by load of the horn actuating cover 14 and the load of the horn actuating cover 14 is counterbalanced by elastic force of the bent portion 38. As a result, the horn actuating cover 14 may be supported while being floated outside the cover mounting portion 12 with a gap interposed therebetween and thus, shaking of the horn actuating cover 14 due to the gap may be prevented.

Under this condition, when actuating force is applied to the horn actuating cover 14 in the axial direction of the horn actuating cover 14, the elastic member 30 may be compressively deformed and thus, the bent portion 38 generates elastic restoring force while the support portion 36 is moved down in the axial direction of the horn actuating cover 14, whereas the horn actuating cover 14 moves down toward the bottom surface of the cover mounting portion 12 together with the support portion 36 while maintaining the state of being disposed on the support portion 36, as shown in the middle view of FIG. 8 and the right view of FIG. 9.

At this time, the bottom end of the inclined portion 34 comes into contact with the ground terminal 16 of the horn in conjunction with the descending movement of the horn actuating cover 14 and thus, electric conduction contact between the elastic member 30 and the ground terminal 16 of the horn occurs, with the result that electric conduction to the horn for generating alarm sound is made and thus, an alarm sound is generated. When the horn actuating cover 14 is actuated to move down, the bent portion 38 may be further loosened and deformed compared to the state prior to operation of the horn actuating cover 14 and thus, elastic restoring force may be generated.

As shown in the right view of FIG. 8, when the actuating force of the horn actuating cover 14 is removed after the horn actuating cover 14 is moved down, the elastic member 30 works in a way that the support portion 36 ascends to the axial direction of the horn actuating cover 14 and returns back to an original position while the bent portion 38 returns back to an original position by elastic restoring force. At this time, the bottom end of the horn actuating cover 14, which is disposed on the support portion 36, moves upward together with the support portion 36 and thus, the horn actuating cover 14 returns back to an original position. Furthermore, the elastic members 20 and 30 may be made of any metal material such as steel having electric conductivity.

Although exemplary embodiments of the present disclosure are described in detail as above, it is apparent that the scope of the present disclosure is not limited to the exemplary embodiments described in detail and many variations and modifications made to the present disclosure by those skilled in the art using basic idea of the present disclosure as defined in the appended patent claims fall within the scope of the disclosure.

What is claimed is:

1. A horn actuating device for generating alarm sound, comprising;
   a horn actuating cover installed on a cover mounting portion of a steering wheel, and descends while maintaining a gap between the horn actuating cover and the cover mounting portion, wherein the horn actuating cover is installed in a state of being floated outside the cover mounting portion with the gap; and
   a plurality of elastic members disposed between the horn actuating cover and the cover mounting portion, and formed to elastically support shaking of the horn actuating cover, which is caused by the gap, and generates elastic restoring force for returning the horn actuating cover back to an original position while being deformed when the horn actuating cover is actuated.

2. The horn actuating device of claim 1, wherein the elastic member includes:
   a fixing portion fixed to the cover mounting portion;
   an inclined portion formed to be inclined with respect to ascending and descending directions of the horn actuating cover to support a bottom end of the horn actuating cover; and
   a bent portion formed between the fixing portion and the inclined portion, wherein the bent portion is bent to generate elastic restoring force while being deformed when the horn actuating cover is actuated.

3. The horn actuating device of claim 2, wherein the bent portion generates elastic restoring force as the inclined portion is pushed and moved toward the cover mounting portion and is compressed when the horn actuating cover is moved down.

4. The horn actuating device of claim 2, wherein the bent portion is formed to be curved in an inverted U shape and both ends of the bent portion are integrally connected to one end of the fixing portion and one end of the inclined portion respectively.

5. The horn actuating device of claim 2, wherein the elastic member is made of an electric conductive material and when the horn actuating cover is actuated to move down, electrical conductive contact between the elastic member and an electric conductive ground terminal of the horn disposed on the steering wheel occurs to generate an alarm sound.

6. The horn actuating device of claim 5, wherein the ground terminal of the horn is disposed below the inclined portion to cause the ground terminal to contact the inclined portion when the horn actuating cover is actuated to move down.

7. The horn actuating device of claim 1, wherein the elastic member includes:
   a fixing portion fixed to the cover mounting portion;
   an inclined portion having a support portion for supporting a bottom end of the horn actuating cover; and
   a bent portion formed between the fixing portion and the inclined portion, wherein the bent portion is bent to generate elastic restoring force while being deformed when the horn actuating cover is actuated.

8. The horn actuating device of claim 7, wherein the bent portion generates elastic restoring force as the support portion is moved together with the horn actuating portion and is deformed when the horn actuating cover is moved down.

9. The horn actuating device of claim 7, wherein the support portion is formed at the inclined portion to protrude to an opposite side of the cover mounting portion.

10. The horn actuating device of claim 7, wherein the bent portion is formed to be curved in an inverted U shape and both ends of the bent portion are integrally connected to one end of the fixing portion and one end of the inclined portion respectively.

11. The horn actuating device of claim 7, wherein the elastic member is made of an electric conductive material and when the horn actuating cover is actuated to move down, electrical conductive contact between the elastic member and an electric conductive ground terminal of the horn disposed on the steering wheel occurs to generate an alarm sound.

12. The horn actuating device of claim 11, wherein the ground terminal of the horn is disposed below the inclined portion to cause the ground terminal to contact the inclined portion when the horn actuating cover is actuated to move down.

13. The horn actuating device of claim 1, wherein the plurality of elastic members are disposed between the cover mounting portion and the horn actuating cover in a circumferential direction of the horn actuating cover.

14. A horn actuating device for generating alarm sound, comprising;
   a horn actuating cover installed on a cover mounting portion of a steering wheel, and descends while maintaining a gap between the horn actuating cover and the cover mounting portion, wherein the horn actuating cover is installed in a state of being floated outside of the cover mounting portion with the gap, and the horn actuating cover surrounds the cover mounting portion with the gap interposed between the horn actuating cover and the cover mounting portion; and
   a plurality of elastic members disposed between the horn actuating cover and the cover mounting portion, and formed to elastically support shaking of the horn actuating cover, which is caused by the gap, and generates elastic restoring force for returning the horn actuating cover back to an original position while being deformed when the horn actuating cover is actuated.

* * * * *